United States Patent [19]

Kolarik

[11] 4,350,352

[45] Sep. 21, 1982

[54] PISTON RING AND GROOVE ASSEMBLIES

[75] Inventor: Oldrich S. Kolarik, Hagerstown, Md.

[73] Assignee: Mack Trucks, Inc., Allentown, Pa.

[21] Appl. No.: 286,555

[22] Filed: Jul. 24, 1981

[51] Int. Cl.³ .............................................. F16J 9/20
[52] U.S. Cl. ..................................... 277/216; 92/172
[58] Field of Search ............................. 277/216–223; 92/172

[56] References Cited

U.S. PATENT DOCUMENTS

| 1,965,294 | 7/1934 | Marshall |  |
|---|---|---|---|
| 2,160,379 | 5/1939 | Carroll | 277/216 |
| 3,544,564 | 1/1971 | Lassanske |  |
| 3,704,893 | 12/1972 | Hill | 277/216 X |
| 4,123,072 | 10/1978 | Sharp | 277/216 |
| 4,246,833 | 1/1981 | Burkland | 92/172 X |

Primary Examiner—Robert S. Ward, Jr.
Attorney, Agent, or Firm—Bernard, Rothwell & Brown

[57] ABSTRACT

Piston ring and groove assemblies are provided for forming a seal between a piston ring side and an adjacent wall of a piston ring groove during engine operation even when the piston is eccentric or tilted relative to a cylinder within which said piston moves.

11 Claims, 4 Drawing Figures

PISTON RING AND GROOVE ASSEMBLIES

FIELD OF THE INVENTION

This invention relates to piston ring grooves and piston rings and more particularly to improvements in the geometry of piston ring groove walls and their facing piston ring sides to ensure sealing during various positions of piston tilt or eccentricity.

BACKGROUND OF THE INVENTION

Pistons operating in combustion cylinders commonly have piston ring grooves around the upper, peripheral surface of the piston for receiving piston rings. During the piston's compression and expansion strokes, the ring forms a seal by contacting the cylinder wall and a lower wall of the piston ring groove. A purpose of this seal is to prevent blowby, which is the escape of pressurized fluids from the combustion chamber between the piston and the combustion cylinder wall.

Currently, two types of piston rings are most commonly used in internal combustion engines: rectangular rings and keystone rings. The designations refer to the geometric shape of the ring and groove cross section.

The rectangular ring and groove assemblies have superior capability to control blowby, but in heavy duty applications, such as in heavy duty diesel engines, the rings have a tendency to seize in the grooves due to the carbon residue which is carried by the blowby gases and deposited within the ring grooves. On the other hand, in the keystone ring and groove assemblies the rings have the capability of crushing the carbon deposits and remaining free within the grooves, but have a reduced capability of controlling the blowby. This is due to the fact that the sides of the groove and the ring are both conical and that these two surfaces cannot maintain contact around the entire circumference when the ring centerline is offset relative to the groove centerline. Theoretically, there is only a two point contact which results in a gap between the ring and groove sides around most of the circumference under the offset conditions. Since the piston is offset or tilted within the cylinder most of the time, the resulting increase in blowby is significant. Distortion of the ring under pressure, and wear between the ring side and the groove wall during engine break-in is relied on to establish a seal, but reliance on wear detracts from the advantages that might otherwise result from using highly wear-resistant materials.

Various proposals have been made to improve the blowby controlling capability of keystone piston ring and groove assemblies. Reference is made to U.S. Pat. No. 4,123,072 to Sharpe wherein the piston ring side and the facing piston ring groove wall are shaped to ensure two edges of contact between the wall of the piston ring groove and the facing side of the piston ring. This edge-to-edge or line-to-line structure produces stress at the edges of contact to speed the formation of a seal during an engine's run-in period, but the concentration of stress increases wear on the piston ring side and piston groove wall. Blowby occurs despite two edges of contact since the gap between the edges of the ring side, and the groove wall may permit pressurized fluid to escape. When the piston is eccentric or tilted within an associated cylinder, one edge of the ring may unseat from the groove wall, opening the gap between the ring side and the groove wall through which cylinder pressure may leak. Since pistons are positioned at various degrees of eccentricity or tilt during much of the piston cycle, blowby occurs which impairs engine operation.

SUMMARY OF THE INVENTION

To correct these shortcomings, it is an object of this invention to provide a piston ring and groove assembly which seals around the circumference of the piston groove wall even during piston tilt or eccentricity.

It is also an object of this invention to reduce the contact stresses between piston ring sides and groove walls so as to reduce wear-rates.

It is a further object of this invention to provide piston ring sides and groove walls with geometries that allow the use of highly wear resistant materials without degrading the seal.

A further object of this invention is to improve the heat transfer capability of piston ring and groove assemblies.

These and other objects are achieved in accordance with this invention by providing a piston ring groove having at least the bottom or lower wall spherically-convex with a relatively large radius of curvature. The spherically-convex groove wall of this invention may be used with piston rings having the side facing the spherically-convex wall conical or spherically-concave with a radius substantially equal to or greater than the radius of the facing groove wall. It has been found that using a spherically-convex groove wall ensures a surface of contact, or at a minimum a line of contact, between the groove wall and the facing ring side which seals around the entire circumference of the groove providing a good seal even when the piston is eccentric or tilted with respect to an associated cylinder. Providing sealing contact between the wall of the groove and the side of the ring despite piston eccentricity or tilt, reduces blowby and enhances the heat conducting capability of the piston ring and groove assembly. Since the piston ring and groove form a seal by fitting together along the entire circumference of the groove, the groove wall and the ring side may be made of highly wear resistant material without degrading the seal.

DETAILED DESCRIPTION OF THE INVENTION

Figure 1A:
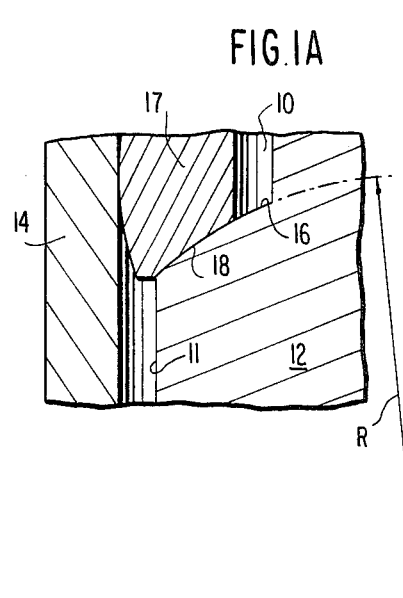
FIGS. 1A, 1B and 1C are enlarged sectional views of three keystone-type piston ring and groove assemblies in accordance with this invention.
Figure 1C:
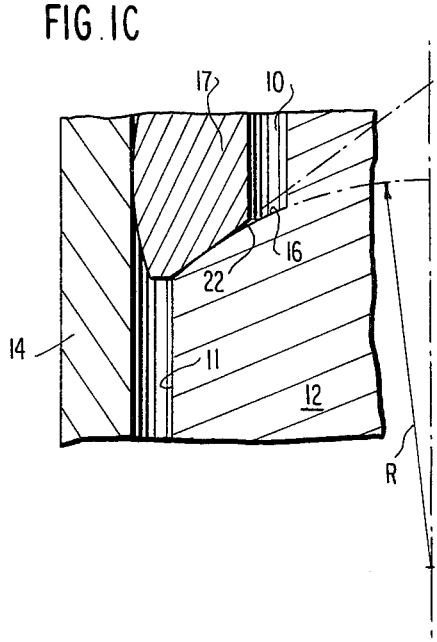
Figure 1B:
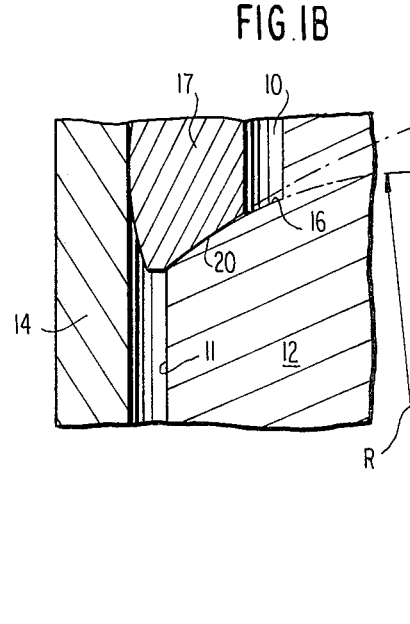

Referring to FIGS. 1A, 1B and 1C, there are shown piston ring and groove assemblies in accordance with this invention. Groove 10 extends around peripheral surface 11 of piston 12 in a plane generally perpendicular to the peripheral surface 11. To ensure a seal of pressure above piston 12 in a cylinder 14, and to effect the purposes of this invention, it is essential that bottom or lower wall 16 of piston groove 10 be spherically-convex. An upper or top wall (not shown in FIGS. 1A, 1B or 1C) of groove 10 may be of the same shape as the lower wall 16 to achieve similar advantages when the pressure differential across the piston ring is reversed. The upper wall of groove 10 may, however, have a different shape.

Piston ring 17 may be shaped in a generally complementary fashion to the piston ring groove. For instance, in keystone-type assemblies, a wall or both walls of the groove are inwardly inclined, making the groove wider at the peripheral surface of the piston than at the inner portion of the groove. The piston ring may similarly have a side or sides which are inwardly inclined making the ring thicker at the outside diameter than at the inside diameter to complement an inwardly inclined groove. When the upper or lower sides of the ring are shaped in such a generally complementary fashion to the adjacent groove wall, they may also be of substantially conical or concave shape.

While the terms upper or top and lower or bottom walls and ring sides have been used herein as they apply to pistons and rings in the vertical or inclined positions, the terms upper and top refer to the side or wall disposed nearer the combustion chamber or head of the piston, while the terms lower or bottom refer to the side or wall disposed further from the combustion chamber of the cylinder or head of the piston. For simplicity the terms lower and upper are used herein and in the appended claims in this more general sense.

To reduce stress between lower ring sides 18, 20 and 22 of the respective assemblies 1A, 1B and 1C and facing lower wall 16, and to ensure sealing contact between the lower ring surfaces 18, 20 and 22 and the lower wall 16 around the circumference of the groove 10 at various positions of piston tilt or eccentricity, the radius of curvature, R, of the spherically-convex lower wall 16 should be relatively large and preferably between about 2.5 to 5 times the diameter (D) of the associated cylinder 14. Since the piston is only slightly smaller than the cylinder, this ratio of R to D may also generally apply with respect to the diameter of the piston. (For purposes of illustration, the relative proportions of the piston, the piston ring and groove and the associated cylinders are distorted in FIGS. 1A, 1B, 1C and 2). The upper wall of groove 10 may also be of spherically-convex shape similar to the lower wall 16. The spherically-convex groove wall 16 may be used with a spherically-convex facing ring side 18 with a radius of curvature essentially equal to R, a concave facing ring side 20 with a radius of curvature greater than R, or with a conical facing ring side 22. Ring walls 18, 20 or 22 are inwardly-inclined and may be of substantially conical or concave shape and at least approximately complementary to the shape of the lower wall 16 of groove 10. While any of the described inwardly-inclined ring sides may be used with groove wall 16 to achieve the objects of this invention, the ring and groove assemblies shown in 1A, 1B, and 1C have different operating characteristics.

Embodiment 1A shows the spherically-convex lower wall 16 of groove 10 used with a spherically-concave ring side 18. To provide maximum contact surface between the lower ring side 18 and lower groove wall 16, the radius of curvature of the concave lower side 18 of the piston ring is essentially equal to the radius of curvature, R, of the spherically-convex lower wall.

Embodiment 1C shows the spherically-convex lower wall 16 of the invention used with a conical, inwardly-converging lower ring side 22. This embodiment may be the easiest to implement of those illustrated, but it results in higher contact stresses between the lower wall 16 and the lower ring side 22 than in embodiment A and in less heat transfer area. The improvement of the present invention over the performance of prior art ring and groove assemblies in preventing blowby, and in lowering wear rates and heat conduction results from the spherically-convex geometry of the lower wall 16 which ensures that the lower ring side 22 will contact the lower groove wall 16 around the circumference of said groove even when the piston is eccentric or tilted within the cylinder 14.

Embodiment 1B illustrates the spherically-convex bottom wall 16 of this invention used with a concave lower ring side 20 having a radius of curvature greater than the radius of curvature, R, of the spherically-convex bottom wall 16. This embodiment produces a greater effective contact surface than assembly C and allows for greater production tolerances in the manufacture of the ring side and the ring groove wall than in embodiment 1A.

Figure 2:
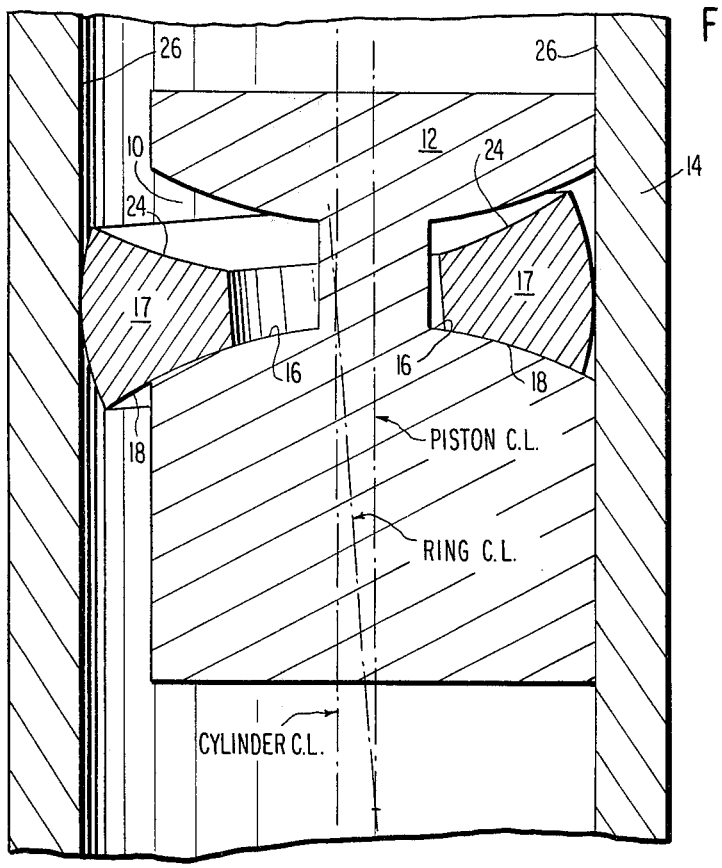
FIG. 2 is a sectional view of a piston ring and groove assembly in accordance with this invention wherein the piston is eccentric within an associated cylinder.

In operation, the greatest stress on the seal between the piston ring and the groove wall occurs during the compression stroke and expansion stroke of the piston. As illustrated in FIG. 2, in which piston 12 is eccentric within cylinder 14 and piston ring 17 is tilted, the compressed gases within the cylinder 14 exert forces on the upper surface 24 of the piston ring 17 pressing lower ring side 18 in contact with the bottom wall 16 of the groove 10. Simultaneously, the gases in the groove push the piston ring 17 against inner wall 26 of the combustion cylinder 14.

The objects of this invention are achieved by providing a contact surface between the piston ring side 18, 20 or 22 and the groove wall 16 around the circumference of the groove to produce an effective seal even during positions of piston tilt or eccentricity. The contact surface between the piston ring and the adjacent groove wall of the invention also distributes the load around the circumference of the groove throughout the piston cycle thereby reducing the stress on the piston ring surface and facing groove wall. The groove wall 16 and the facing ring surface 18, 20 or 22 seal by fitting together around the circumference of the groove at various positions of piston or ring tilt or eccentricity, enabling the piston ring surface and the groove wall to be made of highly wear-resistant material without degrading the quality of the seal which may otherwise occur if the lower wall of the piston groove were differently shaped.

What is claimed is:

1. A piston ring and groove assembly for forming a seal during piston tilt or eccentricity within a cylinder, comprising:
   (a) a piston;
   (b) a piston ring groove around a peripheral surface of said piston, said groove having a spherically-convex lower wall with a radius of curvature;
   (c) a piston ring in said groove for forming a seal with said cylinder and said groove, said ring having a first side facing said spherically-convex lower wall of said groove and a second side opposite said first side; and,
   (d) said first side of said ring contacting said spherically-convex lower wall of said groove to form a seal around the circumference of said groove at all times, even when said piston is tilted or eccentric in a cylinder.

2. A piston ring and groove assembly as recited in claim 1 wherein one or both sides of said ring are inwardly inclined so the ring is thinner at the inside diameter than at the outside diameter and said groove wall or walls are inwardly inclined to produce a groove that is narrower inside than at the peripheral surface of said piston.

3. A piston ring and groove assembly as recited in claim 1 or claim 2 wherein said first side of said ring is spherically-concave with essentially the same radius of curvature as said spherically-convex lower wall of said groove.

4. A piston ring and groove assembly, as recited in claim 1 or claim 2 wherein said first side of said ring is substantially conical.

5. A piston ring and groove assembly as recited in claim 1 or claim 2 wherein said first side of said ring is concave with a radius of curvature greater than the radius of curvature of said spherically-convex lower wall of said groove.

6. A piston ring and groove assembly as recited in claim 1 or claim 2 wherein the radius of curvature of said spherically-convex lower wall of said groove is about 2.5 to 5 times the diameter of said cylinder.

7. A piston ring and groove assembly as recited in claim 1 or claim 2 wherein an upper wall of said groove is of spherically-convex shape with a radius of curvature.

8. A piston ring and groove assembly as recited in claim 7 wherein the radius of curvature of said spherically-convex upper wall of said groove is about 2.5 to 5 times the diameter of said cylinder.

9. A piston ring and groove assembly as recited in claim 8 wherein said second side of said ring is spherically-concave with essentially the same radius of curvature as said spherically-convex upper wall of said groove.

10. A piston ring and groove assembly as recited in claim 8 wherein said second side of said ring is substantially conical.

11. A piston ring and groove assembly as recited in claim 8 wherein said second side of said ring is concave with a radius of curvature greater than the radius of curvature of said spherically-convex upper wall of said groove.

* * * * *